UNITED STATES PATENT OFFICE.

FRANCIS E. J. LITOT, OF WILKINSBURG, PENNSYLVANIA.

SOLDERING COMPOUND.

1,194,648.

Specification of Letters Patent.

Patented Aug. 15, 1916.

No Drawing. Application filed March 22, 1915. Serial No. 16,253.

*To all whom it may concern:*

Be it known that I, FRANCIS E. J. LITOT, a resident of Wilkinsburg, in the county of Allegheny and State of Pennsylvania, have invented a new and useful Improvement in Soldering Compounds, of which the following is a specification.

This invention relates to a soldering composition for soldering aluminum either to itself or to other metals. Heretofore it has been found impractical to solder aluminum effectively, that is, in a way so that the soldered joint would withstand the ravages of time and the changes of temperature and moisture.

The present invention has for its object a composition whereby aluminum parts may be soldered to each other or to other metals, and in which the soldered connection is both strong and durable.

It is also an object of the invention to provide a soldering compound which has a sufficiently low melting point and thus prevent annealing of the aluminum being soldered because of too high a heat being required to melt the solder.

In its preferred form the soldering composition consists of zinc alloyed with phosphor tin or some other metal melting at a lower temperature, in certain definite proportions. I have discovered that zinc alone forms a good solder for aluminum articles, but its melting point is so high that the ordinary workman is liable to overheat the aluminum, particularly if the aluminum is in thin sheets, and seriously injure the same.

In order to reduce the melting point of the zinc and render it more fluid, phosphor tin or some other metal melting at a low temperature, is added. It is the phosphor element of the phosphor tin particularly which renders the alloy when heated very fluid, but in addition to this, the solder makes use of the well known principle that the combination of any two metals usually forms an alloy having a lower melting point than the one metal alone. These metals may be combined in various proportions but as a general rule the amount of phosphor tin or other metal melting at a low temperature which is added, will be kept to a minimum.

The preferred proportions of zinc and phosphor tin in this solder lie between 1 to 10 parts of phosphor tin to 100 parts of zinc. The smaller the proportion of phosphor tin present in this particular solder the greater will be its enduring qualities, since it will not be so subject to electrochemical action, but also the higher will be its melting point. This solder when it contains a small percentage of phosphor tin has much greater enduring qualities than that above described, but has a melting point which is appreciably higher.

The proportions are susceptible of some variation between the limits given, but the closer the proportion of phosphor tin to zinc approaches the ratio of 1 to 100, the more durable will be the joint which is formed. Just enough of the phosphor tin should be added to give to the alloy a sufficiently low melting point, that is, sufficient fluidity, so as to prevent overheating the aluminum. The upper limit of phosphor tin above given, to wit, 10 parts of phosphor tin to 100 parts of zinc, is as high as can be safely employed.

What I claim is—

1. A soldering compound containing zinc as its main ingredient and having alloyed therewith phosphorus in some form, the amount of phosphorus not exceeding 1 per cent. of the entire compound.

2. A soldering compound containing zinc as its main ingredient and having alloyed therewith phosphor tin, the phosphor tin not exceeding 5 per cent. of the entire compound.

3. A soldering compound containing zinc as its main ingredient and having alloyed therewith phosphor tin, the phosphor tin not exceeding 2 per cent. of the entire alloy.

In testimony wherof, I have hereunto set my hand.

FRANCIS E. J. LITOT.

Witnesses:
GLENN H. LERESCHE,
WILLIAM B. WHARTON.